(12) United States Patent
McGee et al.

(10) Patent No.: US 7,170,566 B2
(45) Date of Patent: Jan. 30, 2007

(54) FAMILY HISTOGRAM BASED TECHNIQUES FOR DETECTION OF COMMERCIALS AND OTHER VIDEO CONTENT

(75) Inventors: Thomas McGee, Garrison, NY (US); Lalitha Agnihotri, Fishkill, NY (US); Nevenka Dimitrova, Yorktown Heights, NY (US); Radu Serban Jasinschi, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1284 days.

(21) Appl. No.: 10/028,378

(22) Filed: Dec. 21, 2001

(65) Prior Publication Data

US 2003/0117530 A1 Jun. 26, 2003

(51) Int. Cl.
*H04N 5/222* (2006.01)
(52) U.S. Cl. ..................................... 348/722
(58) Field of Classification Search .............. 348/722, 348/700, 701, 907, 465, 473, 553, 460, 552; 725/22
See application file for complete search history.

(56) References Cited

U.S. PATENT DOCUMENTS 4,677,466 A * 6/1987 Lert et al. ................. 725/22
4,750,052 A * 6/1988 Poppy et al. .............. 386/63
4,782,401 A 11/1988 Faerber et al.

(Continued)

FOREIGN PATENT DOCUMENTS

EP 0735754 A2 10/1996

(Continued)

OTHER PUBLICATIONS

N. Dimitrova and M. Abdel-Mottaleb, "Content-Based Video Retrieval by Example Video Clip," Proceedings of Storage and Retrieval for Image and Video Database V, SPIE vol. 3022, pp. 59-70, San Jose, CA, 1997.

(Continued)

*Primary Examiner*—Paulos M. Natnael

(57) ABSTRACT

Techniques are disclosed for detecting commercials or other particular types of video content in a video signal. In an illustrative embodiment, color histograms are extracted from frames of the video signal. For each of at least a subset of the extracted color histograms, the extracted color histogram is compared to a family histogram. If the extracted color histogram falls within a specified range of the family histogram, the family histogram is updated to include the extracted color histogram as a new member. If the extracted color histogram does not fall within the specified range of the family histogram, the family histogram is considered complete and the extracted color histogram is utilized to generate a new family histogram for use in processing subsequent extracted color histograms. The resulting family histograms are utilized to detect commercials or other particular type of video content in the video signal.

21 Claims, 2 Drawing Sheets

U.S. PATENT DOCUMENTS

| | | | |
|---|---|---|---|
| 4,945,412 A * | 7/1990 | Kramer | 348/460 |
| 5,151,788 A * | 9/1992 | Blum | 348/725 |
| 5,668,917 A * | 9/1997 | Lewine | 386/52 |
| 5,708,477 A * | 1/1998 | Forbes et al. | 348/552 |
| 5,870,754 A * | 2/1999 | Dimitrova et al. | 707/104.1 |
| 6,002,443 A * | 12/1999 | Iggulden | 348/553 |
| 6,100,941 A * | 8/2000 | Dimitrova et al. | 348/700 |
| 6,137,544 A * | 10/2000 | Dimitrova et al. | 348/700 |
| 6,469,749 B1 * | 10/2002 | Dimitrova et al. | 348/722 |
| 6,597,405 B1 * | 7/2003 | Iggulden | 348/553 |
| 6,714,594 B2 * | 3/2004 | Dimitrova et al. | 375/240.16 |

FOREIGN PATENT DOCUMENTS

| | | | |
|---|---|---|---|
| EP | 1161098 A2 | 5/2001 | |
| WO | WO 83/00971 | 3/1983 | |
| WO | WO 94/27404 | 11/1994 | |

OTHER PUBLICATIONS

N. Dimitrova, J. Martino, L. Agnihotri and H. Elenbaas, "Color Super-Histograms for Video Representation," IEEE International Conference on Image Processing, Kobe, Japan, 5 pages, 1999.

L. Agnihotri and N. Dimitrova, "Video Clustering using SuperHistograms in Large Archives," Visual 2000, Lyon, France, 12 pages, 2000.

* cited by examiner

US 7,170,566 B2

FAMILY HISTOGRAM BASED TECHNIQUES FOR DETECTION OF COMMERCIALS AND OTHER VIDEO CONTENT

RELATED APPLICATION

The present invention is related to the invention described in U.S. patent application Ser. No. 09/417,288 filed Oct. 13, 1999 in the name of inventors N. Dimitrova, L. Agnihotri and T. McGee and entitled "Automatic Signature-Based Spotting, Learning and Extracting of Commercials and Other Video Content," which is incorporated by reference herein.

FIELD OF THE INVENTION

The present invention relates generally to video signal processing, and more particularly to techniques for processing video signals to identify and extract commercials or other types of video content having particular characteristics.

BACKGROUND OF THE INVENTION

Many different systems have been developed for the detection and extraction of commercials from broadcast or recorded video signals. For example, U.S. Pat. No. 4,782,401 entitled "Editing Method and Apparatus for Commercials During Video Recording" describes a hardware-oriented solution for editing out commercials in the analog domain, based on the presence of dark or blank frames used to delineate commercials.

A similar system is described in PCT Application No. WO 83/00971, entitled "Reciprocating Recording Method and Apparatus for Editing Commercial Messages from Television Signals." This system edits out commercials based on fade-in and fade-out at the beginning and end, respectively, of a commercial break.

Another approach, described in U.S. Pat. No. 4,750,052 entitled "Apparatus and Method for Deleting Selected Program Intervals from Recorded Television Broadcasts," utilizes a fade detector to edit commercials from a recorded broadcast program.

PCT Application No. WO 94/27404, entitled "Method and Apparatus for Classifying Patterns of Television Programs and Commercials," uses feature extraction and a neural network to classify video signals. The system detects changes in features such as power amplitude over the frequency spectrum, color and brightness, vertical interval time code, closed caption signal, and color carrier jitter signal.

A system described in PCT Application No. WO 95/06985, entitled "Process and Device for Detecting Undesirable Video Scenes," stores an image from a broadcast program that precedes a commercial break so that the end of the commercial break may be detected by means of comparing a current image to the stored image. This approach makes use of the fact that broadcasters often repeat a small part of the program after the end of the commercial break.

European Patent Application No. EP 735754, entitled "Method and Apparatus for the Classification of Television Signals," uses a set of features and associated rules to determine if the current commercials satisfy the same criteria with some degree of "fuzziness." The set of features includes, e.g., stereo versus mono, two-channel audio, sound level, image brightness and color, and logos, used to characterize commercials. An extensive set of rules is required to accommodate thresholds and parameter variations for these features.

U.S. Pat. No. 5,708,477, entitled "Video Signal Identifier for Controlling a VCR and Television Based on the Occurrence of Commercials," uses a video signal identifier to recognize previously-identified commercial material and to reject it either by muting the television sound and/or pausing the VCR when it is in record mode. A significant problem with this approach is that it fails to provide automatic detection, i.e., it requires the material to be identified in some way prior to its detection.

A system described in U.S. Pat. No. 5,668,917, entitled "Apparatus and Method for Detection of Unwanted Broadcast Information," uses the repetitiveness of commercials to identify commercial material. This system stores video frames in a compressed format and compares frames in original "raw" format pixel by pixel. If the pixels match, within some threshold, then the frames are considered similar. A serious drawback of this approach is the excessive memory and computational resources that it requires. More particularly, storing video even in a compressed format takes an impractically large amount of memory space, e.g., approximately 200 GB per day for one channel of high definition television (HDTV) content. In addition, comparing raw video is very time consuming. Even assuming that compressing and decompressing video can be implemented at no additional computational cost, comparing frames will be a very slow process. A given incoming frame must be compared with the above-noted large amounts of stored video material, and the comparison completed before the next frame arrives.

The techniques described in the above-cited U.S. patent application Ser. No. 09/417,288 provide substantial improvements over the conventional approaches outlined above, through the use of signature-based spotting, learning and extraction. However, despite the substantial improvements provided by these techniques, a need nonetheless remains for further improvements in the identification and extraction of commercials and other types of video content.

SUMMARY OF THE INVENTION

The invention provides improved techniques for detecting commercials or other particular types of video content in a video signal, utilizing an approach based on groups of family histograms. The particular type of video content may be, e.g., a commercial in a live or recorded broadcast program.

In accordance with one aspect of the invention, color histograms are extracted from frames of the video signal, and for each of at least a subset of the extracted color histograms, the extracted color histogram is compared to a family histogram. The set of frames from which the color histograms are extracted may be, e.g., keyframes extracted at shot boundaries of the video signal, intra-coded frames (I-frames) of the video signal, or all frames of the video signal. The family histogram utilized in processing a first one of the extracted color histograms may comprise an initial family histogram initialized to a predetermined configuration. As another example, the first one of the extracted color histograms may itself be designated as the initial family histogram. If the extracted color histogram falls within a specified range of the family histogram, the family histogram is updated to include the extracted color histogram as a new member. If the extracted color histogram does not fall within the specified range of the family histogram, the family histogram is considered complete and the extracted color histogram is utilized to generate a new family histogram for use in processing subsequent extracted color histograms. The resulting family histograms as generated over multiple frames are utilized to detect commercials or other particular type of video content in the video signal.

In accordance with another aspect of the invention, the family histogram is updated for a given one of the extracted color histograms falling within the specified range of the family histogram by combining the family histogram with the given extracted color histogram.

In accordance with a further aspect of the invention, the duration and/or repetitiveness of the family histograms are used to mark boundaries of a commercial segment or other particular type of video content. For example, a family histogram may be indicated as being likely to be associated with the particular type of video content if the family histogram has a duration falling within a specified range, such as about 15 to 60 seconds for video content comprising a commercial in a live or recorded broadcast program. The repetitiveness determination may involve determining if the family histogram is one of a series of consecutive family histograms each having a specified duration, or determining if the family histogram is a substantial repeat of a previous family histogram occurring within a designated period of time after the previous family histogram Advantageously, the invention allows commercials and other types of video content to be identified in a particularly accurate and efficient manner. These and other features and advantages of the present invention will become more apparent from the accompanying drawings and the following detailed description.

DETAILED DESCRIPTION OF THE INVENTION

Figure 1:
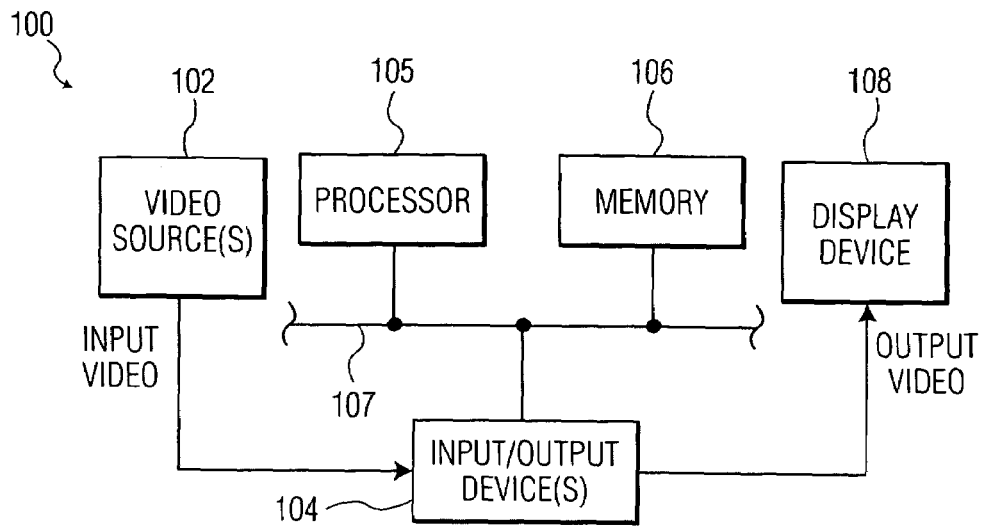
FIG. 1 is a block diagram of a video processing system in which the invention may be implemented.

FIG. 1 shows a video processing system 100 in which video detection techniques in accordance with the present invention may be implemented. The system 100 may represent a television, a set-top box, a desktop, laptop or palmtop computer, a personal digital assistant (PDA), a video storage device such as a video cassette recorder (VCR), a digital video recorder (DVR), a TiVO device, etc., as well as portions or combinations of these and other video processing devices.

The system 100 includes one or more video sources 102, one or more input/output devices 104, a processor 105 and a memory 106. The video source(s) 102 may represent, e.g., a television receiver, a VCR or other video storage device, or any other type of video source, as well as various combinations of multiple such sources. The source(s) 102 may alternatively represent one or more network connections for receiving video from a server or servers over, e.g., a global computer communications network such as the Internet, a wide area network, a metropolitan area network, a local area network, a terrestrial broadcast system, a cable network, a satellite network, a wireless network, or a telephone network, as well as portions or combinations of these and other types of networks.

The input/output devices 104, processor 105 and memory 106 communicate over a communication medium 107. The communication medium 107 may represent, e.g., a bus, a wired or wireless communication network, one or more internal connections of a circuit, circuit card or other device, as well as portions and combinations of these and other communication media.

Input video from the source(s) 102 is processed in accordance with one or more software programs stored in memory 106 and executed by processor 105 in order to generate output video which is supplied to a display device 108, which may be, e.g., a television display, a computer monitor, etc. For example, the one or more software programs may be used to implement at least a portion of the commercial detection process described in conjunction with FIG. 2 below, with the resulting output video including appropriate marks for commercial boundaries within the signal. Display device 108 can then, e.g., process the marks in an otherwise conventional manner to remove the commercials from the displayed video.

It should be understood that the particular configuration of system 100 as shown in FIG. 1 is by way of example only. Those skilled in the art will recognize that the invention can be implemented using a wide variety of alternative system configurations.

For example, the display device 108 may be replaced with or utilized in conjunction with a video storage device, such that the output video is stored for subsequent use. A video storage device may be incorporated into the display device 108, or may be implemented as a stand-alone device coupled to display device 108. Such storage devices are well known in the art, and therefore are not further described herein.

The present invention provides improved techniques for detection of commercials or other types of video content in a video signal. The invention in an illustrative embodiment to be described herein utilizes color histograms extracted from video frames in order to form so-called "family histograms," and then processes the family histograms to identify commercials within the video signal. For example, if a family histogram is between about 15 and 60 seconds in length, a commercial area may be indicated by the presence of several such family histograms within a designated period of time corresponding to the total duration of a multi-commercial break, e.g., about 2 to 3 minutes, 3 to 5 minutes, etc. This indicates the presence of several commercials in a commercial area or segment within the video signal. As mentioned above, boundaries of detected commercials can then be determined and marked, such that the commercials can be removed, fast-forwarded, muted or otherwise dealt with in a video display device such as device 108 of system 100.

Figure 2:
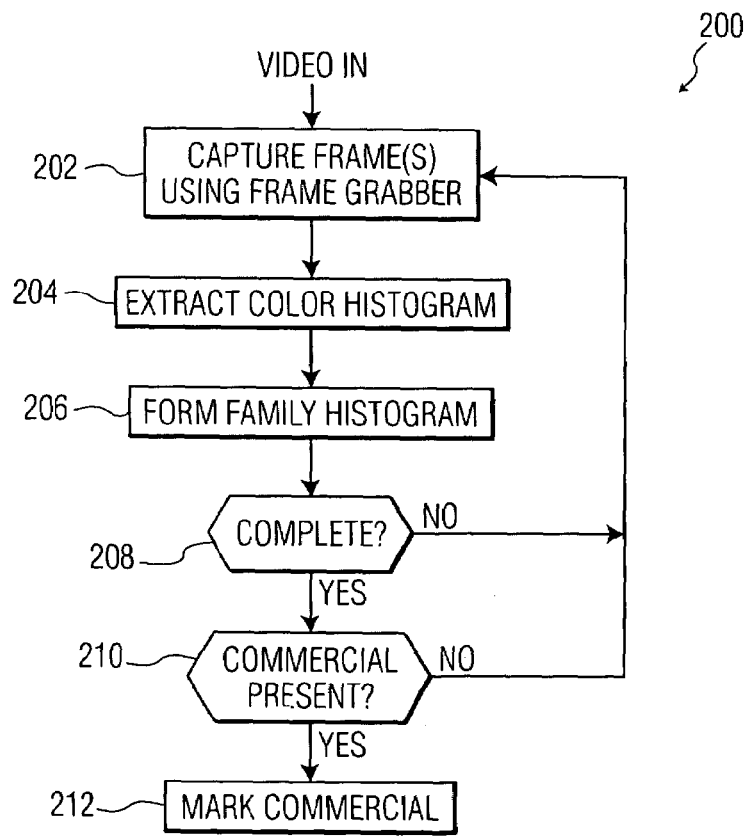
FIG. 2 is a flow diagram of a commercial detection process in accordance with an illustrative embodiment of the invention that may be implemented in the video processing system of FIG. 1.

FIG. 2 is a flow diagram of an example process 200 for detecting commercials in a broadcast video signal, in accordance with the invention. It is assumed for this example that the input video comprises a broadcast video signal including at least one program and multiple commercials. It should be emphasized, however, that this is merely by way of example, and not intended to limit the scope of the invention in any way. More particularly, those skilled in the art will recognize that the invention can be used to identify particular types of video content other than commercials, in other types of video signals, and may be implemented using process steps which differ from those used in the FIG. 2 example.

In step 202 of the process 200, a conventional frame grabber is used to capture one or more frames of the input video signal. For example, the frame grabber can capture one or more "raw" video frames from an analog video signal supplied by an analog video source, or extract such frames from a digital source such as a conventional Moving Pictures Experts Group (MPEG) digital video bitstream.

The set of frames captured by the frame grabber and from which color histograms are subsequently extracted as described below may be, e.g., one or more keyframes extracted at shot boundaries of the video signal, intra-coded frames (I-frames) of the video signal, or all frames of the video signal. A representative keyframe may also be used, as will be illustrated in conjunction with FIG. 3. The term "frame" as used herein is intended to include such a representative keyframe.

Once the frame or frames are obtained, color histogram information is extracted therefrom, as indicated in step 204. The color histograms utilized herein may be generated in accordance with techniques known in the art. For example, details regarding generation and processing of color histograms may be found in N. Dimitrova, J. Martino, L. Agnihotri and H. Elenbaas, "Color Superhistograms for Video Representation," IEEE International Conference on Image Processing, Kobe, Japan 1999; L. Agnihotri and N. Dimitrova, "Video Clustering Using Superhistograms in Large Archives," Visual 2000, Lyon, France, November 2000; and European Patent Application No. EP 1038269, entitled "A Histogram Method for Characterizing Video Content," filed Jul. 7, 1999 in the name of inventors J. Martino, N. Dimitrova, H. Elenbaas and J. Rutgers; the above documents being incorporated by reference herein.

As mentioned previously, the invention is based in part on the concept of a "family histogram," which as used herein refers generally to a histogram generated for a number of related frames, e.g., a number of frames having a similar color palette or are otherwise determined to be related. Step 206 forms a family histogram of this type by comparing a given color histogram extracted in step 204 to a previous family histogram. In an initial pass through steps 202, 204, 206 and 208, the previous family histogram may be initialized to the first extracted color histogram, or otherwise initialized to a specified configuration. Thereafter, the given extracted color histogram from step 204, also referred to as the current extracted histogram, is processed in step 206 to determine if it "belongs to" the previous family histogram. For example, the current extracted histogram may be compared to the previous family histogram, to an average histogram, to a representative frame from the family, or to another element suitable for comparison.

If the current extracted histogram is deemed to be part of the previous family histogram, that family histogram is updated in step 206 to include the new member, with the resulting family histogram being referred to as the current family histogram. The current family histogram is then considered to be incomplete such that the process returns to step 202 via step 208 to process the next frame, for which the current family histogram becomes the previous family histogram. If however, the current extracted histogram does not match the previous family histogram, then the previous family histogram is considered to be complete, and the process moves to step 210 via step 208.

As indicated above, the FIG. 2 process for each of a number of specified frames computes the color histogram and then searches one or more previously-computed family histograms to find the closest family histogram match. The comparison between a given current histogram, $H_C$, and the previous family histograms, $H_P$, can be computed using one of the following methods for calculating histogram difference D or other related comparison entities. Other methods not explicitly described herein can also be used, as will be apparent to those skilled in the art.

(1) The histogram difference D may be computed using the following formula:

$$D = \sum_{i=1}^{N} |H_C(i) - H_P(i)|$$

Here, N is the total number of color bins used. By way of example, the number of bins N may be selected as 9, although other numbers of bins could also be used. The values obtained using this formula range between 0 and twice the maximum number of pixels in respective frames. Since it is desirable to obtain percentage of similarity, one can normalize the obtained value by dividing with the total number of pixels. The normalized values are between 0 and 1, where values close to 0 mean that the frames are similar, and those close to 1 mean that the frames are dissimilar.

(2) The histogram difference D may alternatively be computed using the following formula:

$$D = \sqrt{\sum_{i=1}^{N} (H_C(i) - H_P(i))^2}$$

The values of D in this case may be normalized in a manner similar to that described for case (1) above.

(3) A histogram intersection I may be computed using the following formula:

$$I = \frac{\sum_{i=1}^{N} \min(H_C(i), H_P(i))}{\sum_{i=1}^{N} H_C(i)}$$

The values obtained using this formula range between 0 and 1. Values close to 0 mean that the frames are dissimilar and values close to 1 mean that the frames are similar. In order to compare histograms with he same interpretation of similarity, one can use D=1−I as a distance measure.

(4) A Chi-square test for comparing two frame histograms may be computed by using the following formula:

$$\chi^2 = \sum_{i=1}^{N} \frac{(H_C(i) - H_P(i))^2}{(H_C(i) + H_P(i))^2}$$

In this case, the values range between 0 and the number of color bins, N, so one can normalize with N, i.e. $D = \chi^2/N$.

(5) A bin-wise histogram intersection may be computed using the following formula:

$$B = \sum_{i=1}^{N} \frac{\min(H_C(i), H_P(i))}{\max(H_C(i), H_P(i))}$$

Similar to the above-described histogram intersection, lower values of B mean that frames are dissimilar and higher values mean that frames are similar. To be consistent with the previous measures, one can compute the distance by using D=1−B/N.

As is apparent from the FIG. 2 process as described to this point, a family histogram may be a cumulatively averaged histogram derived from histograms representing frames from consecutive frames, from I-frames, from scene breaks, etc. Such frames, as indicated previously, are referred to herein as keyframes. The histogram of the first encountered frame may be taken to be the family histogram for the first family. Starting from the second frame and for each new encountered frame there should be a decision whether the new frame should be merged with an existing family histogram or if the current frame is substantially different, such that a new family should be started. By way of example, given two histograms extracted from two frames or two keyframes, the difference between these two histograms may be computed. If the difference is less than a certain threshold, then the current histogram is merged into the family histogram.

The family histogram may be implemented as a data structure comprising pointers to each of the constituent histograms and corresponding frame numbers, a merged family histogram, and a variable representing total duration. The latter variable may be initialized to the duration of the scene represented by the current histogram. Merging of family histograms may be performed according to the following formula:

$$H_{fam}(l) = \sum_{i} \left( \frac{dur_i}{\text{total\_dur}_{fam}} \cdot H_i(l) \right)$$

In this formula l is a variable representing the bin number, fam is an index for this particular family, $H_{fam}$ is a vector representing the family histogram, i is an index representing the shot number in the family histogram, $dur_i$ is a variable representing the duration of scene i, $H_i(l)$ is a numerical value indicating the number of pixels in bin l for key frame number i, and total_$dur_{fam}$ is a variable representing the total duration of all scenes already in the family.

Two example techniques for comparing a current histogram against previous family histograms are referred to herein as non-contiguous and contiguous comparison.

In the non-contiguous case, for each frame or keyframe one computes the histogram and then searches a number of the previously-computed family histograms to find the closest family histogram match over a designated time period. If the difference between the frame or keyframe and the closest family histogram within the designated time period is less than a certain threshold, then the current frame or keyframe is added to that family and a new family histogram is computed which includes the new histogram. This results in the clustering of frames that are not next to each other but nonetheless have similar color palettes.

In the contiguous case, for each frame or keyframe one computes the histogram and then searches only the previous family histogram. If the difference between the frame or keyframe and the previous family histogram is less than a certain threshold, then the current frame or keyframe is added to the previous family. Otherwise, a new family is started with the new histogram as the family histogram of the new family.

Figure 3:
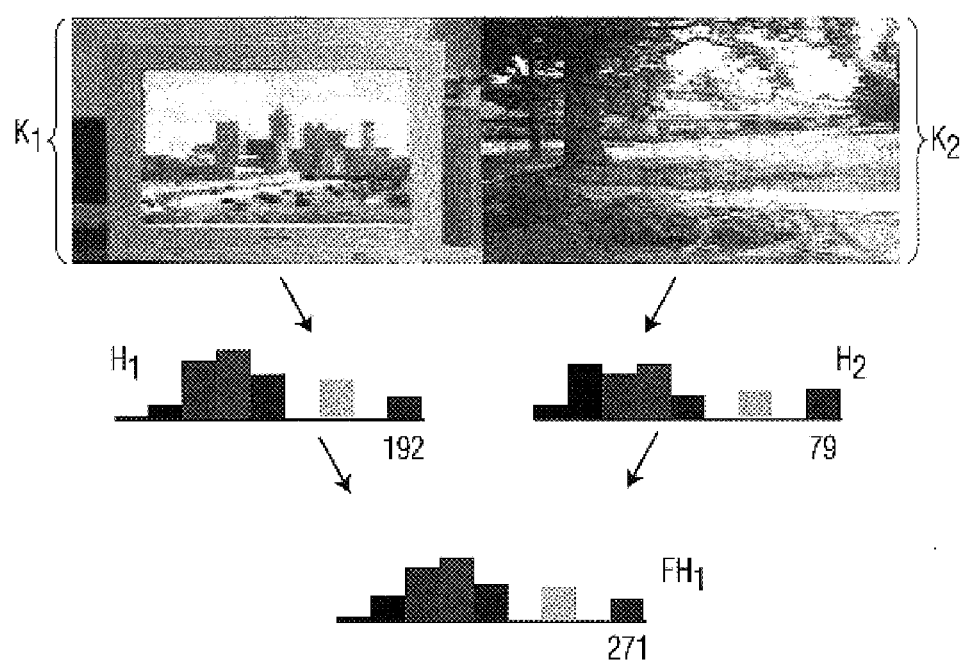
FIG. 3 illustrates the generation of a family histogram in accordance with the techniques of the invention.

FIG. 3 shows an example of one possible manner of generating a family histogram in accordance with the techniques of the invention. In this example, a keyframe $K_1$ represents a sequence of 192 frames, and a keyframe $K_2$ represents a sequence of 79 frames. Color histograms $H_1$ and $H_2$ are extracted from the keyframes $K_1$ and $K_2$, respectively, as indicated in step 204 of FIG. 2. It is further assumed for this example that, based on other processing operations described previously in conjunction with FIG. 2, a decision has been made to combine the color histograms $H_1$ and $H_2$. These histograms are therefore combined into a family histogram $FH_1$ as indicated in the figure.

It should be understood that the example of FIG. 3 is for purposes of illustration only, and should not be construed as limiting the scope of the invention in any way. Those skilled in the art will appreciate that numerous other techniques may be utilized to form family histograms in accordance with the present invention.

Referring again to FIG. 2, in step 210 the current family histogram is analyzed for characteristics representative of a commercial. The analysis applied to the current family histogram in step 210 preferably includes, in the illustrative embodiment, analysis of duration and repetitiveness. With regard to duration, if a given family histogram is between about 15 and 60 seconds in length, it is possible that the given family histogram may be associated with a commercial. If the given family histogram has the duration associated with a commercial, it is further analyzed, preferably in conjunction with one or more additional family histograms, for the above-noted repetitiveness. By way of example, if the given family histogram is one of a series or other group of family histograms each having a length between about 15 and 60 seconds, a commercial segment in the input video is indicated. The particular commercials and/or the commercial segment can then be marked as indicated in step 212.

As another example, the commercial detection in step 210 could be configured to detect a number of short family histograms of duration less than about 10 seconds each within a typical commercial break time period of about 3 to 5 minutes in length.

It is also possible for the commercial detection in step 210 to be configured to detect the number of unique family histograms per minute or per other time period within the typical duration of a commercial break, e.g., about 3 to 5 minutes. More particularly, a commercial break may be indicated by the presence of at least 4 unique family histograms per minute, or some other predetermined number of unique family histograms per minute or other time period. The term "unique" in this context refers to family histograms which differ from one another in a specified manner.

As a further example, the commercial detection in step 210 could be configured to detect the absence of any family histogram having a duration greater than a specified amount of time, such as a duration greater than about 30 seconds.

The commercial detection in step 210 could utilize additional types of analyses. Such analyses could involve, for example, looking for black frames or audio silence between the families, or measuring the cut rate within the families. Additionally, the presence of particular closed caption text or some other known feature can be used to verify that one is indeed in a commercial area. Other examples of additional analyses suitable for use in conjunction with the present invention can be found in the above-cited U.S. patent application Ser. No. 09/417,288.

Also, family histograms having the above-noted short duration of about 15 to 60 seconds can be compared to longer family histograms found during a previous period of a designated length, e.g., a period of about 15 minutes or less. These longer family histograms are typically associated with a broadcast program, rather than a commercial. In general, broadcast programs tend to have longer family histograms, since the visual content is similar over many frames. However, in case of commercials, the short family histograms will generally differ greatly from the longer family histograms associated with programs, since the visual content of commercials is purposely designed to be "catchy" and different from the program content in a short period of time.

As another example, short family histograms determined in the manner described above can be compared to a generic superhistogram of a corresponding program.

In addition, information from a conventional Electronic Program Guide (EPG) can be utilized in the above-described analyses. For example, program name, genre or other details can be obtained from the EPG, and utilized to identify particular generic superhistograms that have been pre-computed and stored for particular programs. A group of family histograms of suitable duration which do not match a pre-computed superhistogram of a particular program airing at the corresponding time and channel can then be identified as likely to be associated with a commercial segment in the program.

It is also possible with regard to repetitiveness to check if the same or similar short family histograms are repeated within a designated period, e.g., a period of an hour or so. This is because certain commercials tend to repeat. For example, beer commercials are frequently repeated in a broadcast sports program. While the family histogram of a beer commercial will typically not match that of a corresponding sports program, it may match a family histogram generated for the airing of the same commercial at a previous point in the sports program.

As yet another example, the commercial detection in step 210 could be configured to detect the absence of multiple previously-identified short family histograms within a designated period of time. More specifically, if a period of time of duration on the order of about 15 minutes or so does not include any of a number of previously-identified short family histograms, that 15 minute period may be a program segment between commercial breaks.

It may also be desirable to utilize the techniques of the invention to detect other types of unwanted content, e.g., violence, explosions, sex or other explicit content. These and other types of content to be detected using the techniques of the invention can be marked by a user, e.g., a user can specify the particular types of content to be excluded or included.

Once particular family histograms have been identified as being associated with commercials or other types of specified video content, these family histograms can be used to mark the boundaries of such content.

It should be noted that a given family histogram may be represented by a keyframe which can be a first, last or any designated or randomly chosen frame within that family histogram, a keyframe determined to be most closely related to the family histogram, or an average of the individual frame histograms making up the given family histogram. These and other representations are intended to be included within the term "family histogram" as used herein.

Advantageously, the illustrative process described in conjunction with FIG. 2 may be used to identify even those commercials or other types of video content that have substantially a single color palette. For example, in the case of commercials, the commercials are typically about 15 to 60 seconds long, and this would be reflected in the duration of the corresponding family histogram or its presence within a series of a number of other family histograms of similar duration.

Another illustrative embodiment of the invention can be implemented utilizing a color entropy method. The method is illustrated below as applied to I-frames of an MPEG-encoded video sequence, and includes the following steps:

1. For each I-frame of the MPEG-encoded video sequence, compute an N-bin color histogram.

2. Determine which bin has the highest number of votes. Normalize the histogram by dividing the total number of votes per bin by this highest number of votes. This will result in a probability vector $\vec{p}^{I_j} \equiv (p_1^{I_j}, \ldots, p_N^{I_j})$ for the jth I-frame $I_j$.

3. Compute the color entropy $$S = -\sum_i p_i^{I_j} \times \log p_1^{I_j}$$

for the jth I-frame $I_j$.

4. Given a temporal sliding window W of, e.g., 10 seconds, which is centered at the jth I-frame $I_j$, and which includes a total of F I-frames, compute the average entropy $$\langle S \rangle = -\frac{1}{F} \sum_j \sum_i p_1^{I_j} \times \log p_i^{I_j}.$$

5. Inside the window W compute the mean and variance of $\langle S \rangle$: $\overline{\langle S \rangle}$ and $(\langle S \rangle - \overline{\langle S \rangle})^2$, respectively.

6. If, as the window W slides from I-frame to I-frame, the variance computed in step 5 exhibits a peak, after some 2 or 3 successive I-frames, determine the first I-frame for which this happened as a candidate for a new video segment. If after this change, the variance still remains high, then tag this first I-frame as a candidate for a commercial. On the other hand, if this variance drops quickly consider this first I-frame as a candidate for a scene change.

This color entropy method can be implemented into the other techniques described above, e.g., the system of FIG. 1 and the process of FIG. 2, in a straightforward manner. The particular color entropy method shown above is by way of example only, and those skilled in the art will recognize that other color entropy methods may be implemented in accordance with the techniques of the present invention.

As indicated previously, once the commercials or other types of video content have been detected by the system 100 using the above-described techniques, conventional approaches for removing or otherwise dealing with the marked commercials or other content, e.g., by fast-forwarding through a recorded broadcast, muting a television, jumping to a designated point in a digital video signal, etc., can be applied in a straightforward manner.

Another advantage of the invention is that the above-described techniques can be implemented without excessively high memory or computational requirements.

Although well-suited for commercial detection, the invention can be used in conjunction with the detection of any specified type of video content, e.g., any desired type of content for display or recording and subsequent playback, or any undesirable type of content to be edited out.

The above-described embodiments of the invention are intended to be illustrative only. For example, the invention can be used to implement detection of other types of image signals, in any desired type of video processing system or device, and in many applications other than those specifically described herein. In addition, although illustrated using color histograms, the techniques of the invention can be implemented using other types of histograms, e.g., intensity histograms, etc. The invention can also be implemented at least in part in the form of one or more software programs which are stored on an otherwise conventional electronic, magnetic or optical storage medium or other type of memory and executed by a processing device, e.g., by the processor 105 of system 100 in FIG. 1. These and numerous other embodiments within the scope of the following claims will be apparent to those skilled in the art.

What is claimed is:

1. A method for use in processing a video signal, the method comprising the steps of:
   extracting histograms from a plurality of frames of the video signal;
   for each of at least a subset of the extracted histograms, comparing the extracted histogram to a family histogram, and if the extracted histogram falls within a specified range of the family histogram, updating the family histogram to include the extracted histogram as a new member, and if the extracted histogram does not fall within the specified range of the family histogram, indicating the family histogram as being complete and utilizing the extracted histogram to generate a new family histogram for use in processing subsequent extracted histograms; and
   utilizing one or more of the family histograms to detect a particular type of video content in the video signal.

2. The method of claim 1 wherein the particular type of video content comprises a commercial in a live or recorded broadcast program.

3. The method of claim 1 wherein the family histogram utilized in processing a first one of the extracted histograms (i) comprises an initial family histogram initialized to a predetermined configuration, or (ii) is itself designated as the initial family histogram.

4. The method of claim 1 wherein the family histogram is updated for a given one of the extracted histograms falling within the specified range of the family histogram by combining the family histogram with the given extracted histogram.

5. The method of claim 1 wherein the step of utilizing one or more of the family histograms to detect a particular type of video content in the video signal further comprises determining a duration of the family histogram.

6. The method of claim 5 wherein the family histogram is indicated as being likely to be associated with the particular type of video content if the family histogram has a duration falling within a specified range.

7. The method of claim 6 wherein the specified range is about 15 to 60 seconds for video content comprising a commercial in a live or recorded broadcast program.

8. The method of claim 1 wherein the step of utilizing one or more of the family histograms to detect a particular type of video content in the video signal further comprises determining a repetitiveness of the family histogram.

9. The method of claim 8 wherein the step of determining a repetitiveness of the family histogram further comprises determining if the family histogram is one of a series of consecutive family histograms each having a specified short duration.

10. The method of claim 8 wherein the step of determining a repetitiveness of the family histogram further comprises determining if the family histogram is a substantial repeat of a previous family histogram occurring within a designated period of time after the previous family histogram, wherein the repetitiveness either (i) does not occur in a first previous designated time period of about 3 to 5 minutes, or (ii) does occur in a second previous designated time period of about 15 minutes.

11. The method of claim 1 wherein the step of utilizing one or more of the family histograms to detect a particular type of video content in the video signal further comprises detecting a number of short family histograms of duration less than about 10 seconds each within a time period of about 3 to 5 minutes in length.

12. The method of claim 1 wherein the step of utilizing one or more of the family histograms to detect a particular type of video content in the video signal further comprises detecting a number of unique family histograms occurring within a specified time period.

13. The method of claim 1 wherein the step of utilizing one or more of the family histograms to detect a particular type of video content in the video signal further comprises detecting the absence of any family histogram having a duration greater than a specified amount of time.

14. The method of claim 13 wherein the specified amount of time is about 30 seconds.

15. The method of claim 1 wherein the step of utilizing one or more of the family histograms to detect a particular type of video content in the video signal further comprises comparing one or more family histograms of a specified duration to a superhistogram generated for a particular program.

16. The method of claim 15 wherein the superhistogram for the particular program is pre-computed and stored.

17. The method of claim 15 wherein the particular program and its associated superhistogram are identified using information obtained from an Electronic Program Guide (EPG).

18. The method of claim 1 wherein the step of utilizing one or more of the family histograms to detect a particular type of video content in the video signal further comprises detecting the absence of multiple previously-identified family histograms of at least a given duration within a designated period of time.

19. The method of claim 1 wherein a given family histogram is generated in accordance with a color entropy technique based on determination of one or more peaks in a color entropy variance within a sliding window of intra-coded frames of the video signal.

20. An apparatus for use in processing a video signal, the apparatus comprising:
   a processor operative to process histograms extracted from a plurality of frames of the video signal, the processor being adapted, for each of at least a subset of the extracted histograms, to compare the extracted histogram to a family histogram, and if the extracted histogram falls within a specified range of the family histogram, to update the family histogram to include the extracted histogram as a new member, and if the extracted histogram does not fall within the specified range of the family histogram, to indicate the family histogram as being complete and to utilize the extracted histogram to generate a new family histogram for use in processing subsequent extracted histograms, one or more of the family histograms being utilizable to detect a particular type of video content in the video signal; and a memory coupled to the processor for storing at least a portion of one or more of the extracted histograms and the family histograms.

21. An article of manufacture comprising a machine-readable medium containing one or more software programs for use in processing a video signal, wherein the one or more software programs when executed implement the steps of:

extracting histograms from a plurality of frames of the video signal;

for each of at least a subset of the extracted histograms, comparing the extracted histogram to a family histogram, and if the extracted histogram falls within a specified range of the family histogram, updating the family histogram to include the extracted histogram as a new member, and if the extracted histogram does not fall within the specified range of the family histogram, indicating the family histogram as being complete and utilizing the extracted histogram to generate a new family histogram for use in processing subsequent extracted histograms; and utilizing one or more of the family histograms to detect a particular type of video content in the video signal.

* * * * *